United States Patent
Geiger et al.

[11] 3,867,509
[45] Feb. 18, 1975

[54] PROCESS FOR THE PURIFICATION OF SULFUR AND NITROGEN CONTAINING WASTE WATER AND WASTE GAS

[75] Inventors: Friedhelm Geiger; Theodor Lussling, both of Grossauheim; Wolfgang Igert, Offenbach, all of Germany

[73] Assignee: Deutsche Gold-und Silber-Scheideanstalt vormals Roessler, Frankfurt, Germany

[22] Filed: May 8, 1973

[21] Appl. No.: 358,390

[30] Foreign Application Priority Data
May 16, 1972 Germany.............................. 2223790

[52] U.S. Cl.................. 423/224, 423/236, 423/242, 423/245, 210/62, 210/63, 162/51
[51] Int. Cl............................................ B01d 53/34
[58] Field of Search ........... 423/210, 242, 220, 224, 423/477, 236, 245; 210/62, 63; 162/51, 67

[56] References Cited
UNITED STATES PATENTS

| | | | |
|---|---|---|---|
| 2,745,714 | 5/1956 | Woodward...................... | 423/477 X |
| 3,023,076 | 2/1962 | Karwat................................ | 423/235 |
| 3,149,907 | 9/1964 | Karwat................................ | 423/235 |
| 3,386,915 | 6/1968 | Rutschi et al......................... | 210/62 |

OTHER PUBLICATIONS

Rushton, "Collection & Treatment of Odorous Kraft Mill Gases," Paper Trade Journal, Dec. 18, 1972, pages 36 & 37.

*Primary Examiner*—Earl C. Thomas
*Attorney, Agent, or Firm*—Cushman, Darby & Cushman

[57] ABSTRACT

Sulfur and nitrogen containing waste waters and waste gases are purified by treating with alkali or alkaline earth chlorites in acidic medium at a p H up to 6.

14 Claims, 3 Drawing Figures

PROCESS FOR THE PURIFICATION OF SULFUR AND NITROGEN CONTAINING WASTE WATER AND WASTE GAS

Waste waters and waste gases which have obnoxious odors or contain poisonous materials or, in the case of waste gases, contain fog forming materials, cannot be discharged into streams or into the atmosphere without treatment to eliminate these materials.

The various processes proposed for such treatment have considerable disadvantages; thus the working up of diluted waste gases and waste waters by burning is very expensive.

The direction chlorination of waste water in the presence of ammonia or ammonia forming compounds easily leads to the formation of explosive nitrogen trichlorite.

It is further known to treat waste waters and waste gases with chlorine dioxide. The handling of chlorine dioxide is accompanied by known inconveniences.

Since chlorine dioxide cannot be kept in stock and stored for safety reasons it must be prepared immediately before its use.

The direct production of chlorine dioxide, however, also has the disadvantage in large scale waste water and waste gas purification plants that it can only be regulated with difficulty to the actual requirement. The materials to be purified are subject to wide variations in odor intensity and materials to be oxidized so that even using modern measuring and regulating apparatus there always occur temporary delays accompanied by differences between supply and demand of chlorine dioxide. The use of large excesses of chlorine dioxide is prohibited, however, since in the times of lesser requirements for chlorine dioxide the waste water would be laden with an inadmissibly high amount of free chlorine dioxide.

In contrast it has now been found that waste waters and waste gases which contain oxidizable compounds can be quickly and quantitatively deodorized and detoxified if the waste water and waste gas, even in the presence of ammonia, free or as a compound, is treated with alkali or alkaline earth chlorites in an acid medium. The treated waste water and waste gas can be emptied subsequently without further into streams or the atmosphere. The formation of nitrogen trichloride $NCl_3$ in the presence of ammonia is just as well excluded as the formation of toxic, chlorinated organic compounds.

The waste water or waste gases contain first of all oxidizable sulfur compounds such as hydrogen sulfide, sulfurous acid, mercaptans, e.g. methyl mercaptan, butyl mercaptan, ethyl mercaptan, hexyl mercaptan and octadecyl mercaptan, mercaptoaminocarboxylic acids, e.g. methionine and cysteine, thioethers, e.g. diethyl sulfide, dibutyl sulfide, dimethyl sulfide, octyl decyl sulfide, and divinyl sulfide, disulfides, e.g. cystine and diethyl disulfide, sulfoxides, e.g. dimethyl sulfoxide and dibutyl sulfoxide and other compounds in which the sulfur has a valence of less than 6.

The process, however, is not limited only to the removal of sulfur containing compounds. There likewise can be removed hydrocyanic acid or hydrocyanic acid forming compounds from waste waters as well as compounds such as tyrosine, 3,4-dihydroxyphenyl alanine, tryptophane, histidine (i.e. compounds wherein the nitrogen has a valence less than +5), mono and polyhydric phenols, hydrocarbons, ethers, unsaturated alcohols, acids, esters and aldehydes such as allyl alcohol, toluene, anethol, cinnamyl alcohol, cinnamaldehyde, oleic acid, glyceryl trioleate, furfural, indole and $\beta$-methylindole.

As acid media there are included those having a pH of up to 6. A pH value of up to 7 to be sure is possible but the oxidation takes substantially longer. In general the lower the pH the quicker the oxidation.

As alkali and alkaline earth chlorite solutions there can be used sodium chlorite, potassium chlorite, calcium chlorite, lithium chlorite, barium chlorite, magnesium chlorite and strontium chlorite solutions. Preferably the chlorites are used as aqueous solutions. Sodium chlorite solution is preferred.

The chlorite solutions can be produced by dissolving the solid chlorite or by diluting commercial aqueous chlorite solutions to any desired concentration, for example, by diluting an 80 weight % aqueous sodium chlorite to a solution of 30 weight %. As stated the concentration of the chlorite solution is not critical. Thus for example, it can be from 0.1 to 53 % by weight.

The amount of chlorite is adjusted according to the amount and degree of oxidation of the compound to be oxidized and the degree of oxidation of the end product. The waste water or waste gas is treated with chlorite until the waste water or, in the case of treated waste gases, until the washing liquor still contains 5–100 mg, preferably 5–50 mg of chlorite, per liter.

To establish the pH there can be used all mineral acids which are not oxidized by chlorite and which are sufficiently strong to provide a pH of 6 or below, e.g. sulfuric acid, phosphoric acid, or nitric acid. Preferably there are employed hydrochloric acid or sulfuric acid in aqueous solution. It is simplest to use easily available commercial concentrations since the concentration of acid is not critical.

The purification process is suited for all industries in which sulfur containing waste waters or sulfur containing waste gases occur which contain the sulfur in bound oxidizable form, such as animal disposal plants (flaying plants), animal meal plants and corresponding chemical industries, refineries and coke plants, etc.

In general the waste water or waste gas is treated at the temperature at which it occurs. However, it is suitable to carry out the reaction at elevated temperatures, e.g. at about 80°C.

The process can be carried out either discontinuously or continuously in the usual stirring vessels. There can be used any reactor which guarantees a sufficiently thorough mixing, either by forced circulation or corresponding fixed immovable installations. For commercial processes the continuous forms of carrying out the invention are of primary interest since the process of the invention permits the establishment of a constant pH value by employing customary measuring and regulating devices and the supply of a fixed amount of chlorite dependent upon the condition of the waste gas and waste water.

The industrial advantage of the present process is first in the simple carrying out of the process by direct addition of chlorite without additional installations for the recovery of the oxidizing agent. Furthermore the chlorites used are commercial, easily available products. Besides there are formed no toxic or explosive compounds. Additionally the chlorites are used up quantitatively so that there is no need to provide additional measures for their removal.

The invention will be understood best in connection with the drawings wherein.

Figure 1:
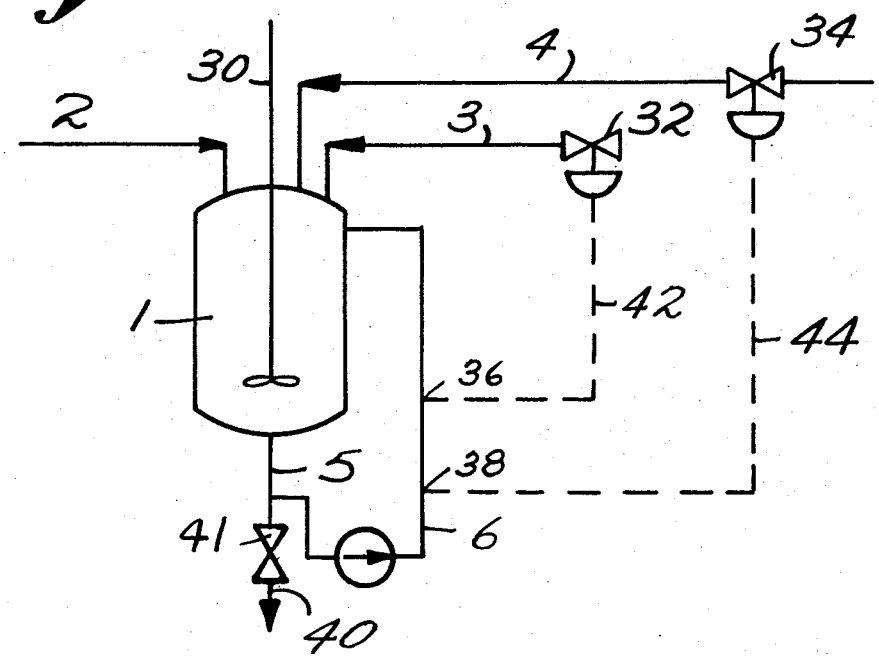
FIG. 1 is a diagrammatic illustration of a process for purifying waste waters, e.g. in the production of methionine.

Referring more specifically to the drawings, FIG. 1 shows the purification of waste waters, for example, from the production of methionine wherein the alkaline waste water is introduced into stirring vessel 1 through conduit 2. The vessel is equipped with a stirrer 30. The acid for acidification is introduced through line 3 equipped with control valve 32 and the aqueous chlorite solution is added through line 4 equipped with control valve 34. The mixture is withdrawn from vessel 1 by line 5 and returned by line 6. Measuring cells 36 and 38 are provided in line 6 to measure the pH and an amount of chlorite respectively. As soon as the desired potential is reached, the purified waste water is drawn off by way of line 40 through valve 41 and without further purification can be emptied into the canal, liquid system, sewer, river or the like.

The acid and chlorite introduction lines 3 and 4 are connected by way of valves 32 and 34 with the measuring cells 36 (pH-electrodes) and 38 (redox-measuring cell) with recirculating lines 5 and 6 by way of lines 42 and 44 respectively. Valves 32 and 34 are regulated according to the adjustment of the regulating instruments. In spite of operational variations in the composition of the waste water, it can be purified continuously.

Figure 2:
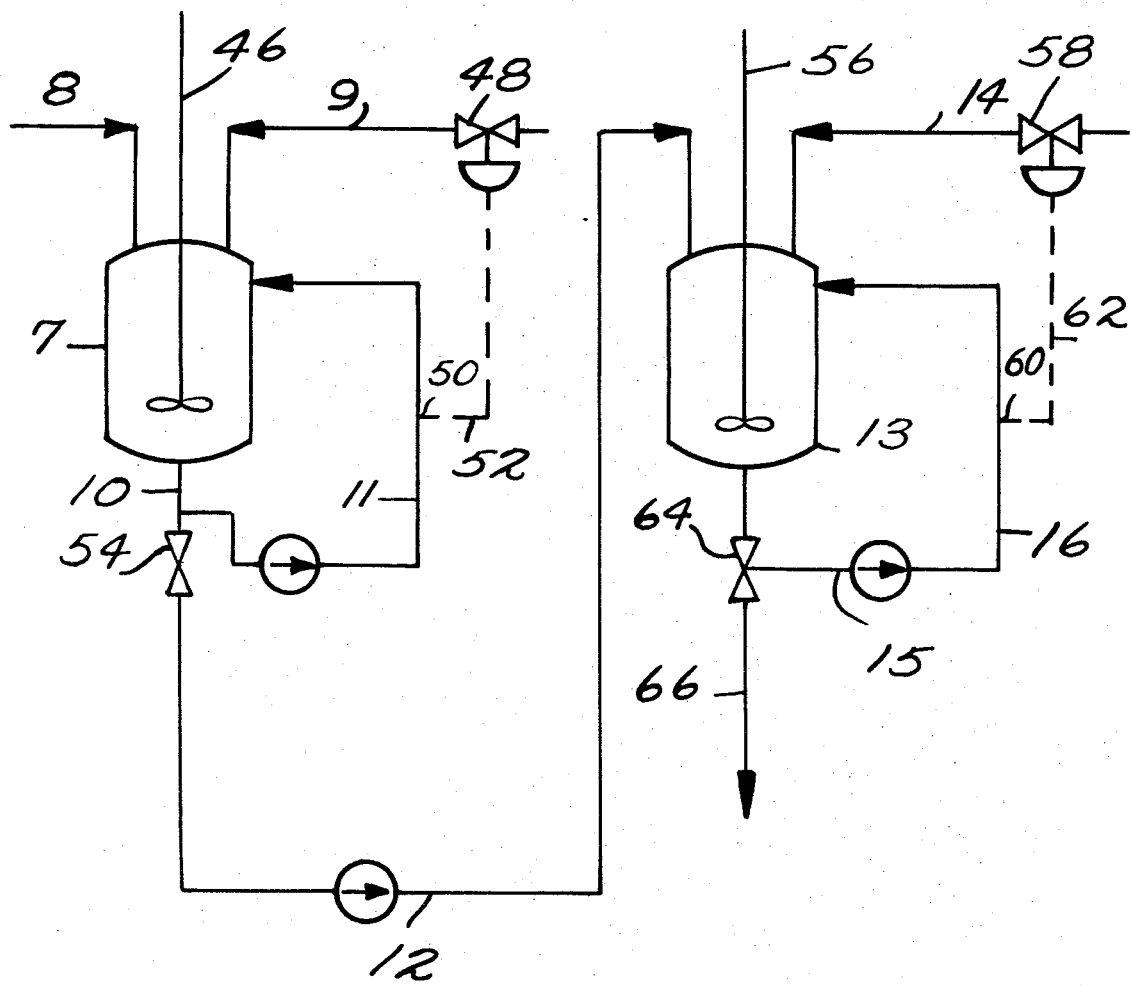
FIG. 2 is an illustration of an alternative procedure according to the invention employing separate vessels for acidification and oxidation.

In a given case it is suitable to carry out the acidification and the oxidation in separate reactors as shown in FIG. 2.

The waste water is fed to stirring container 7 equipped with stirrer 46 through line 8. The acidification to the desired pH value takes place by way of line 9 with the help of regulating valve 48 which is connected by line 52 to the measuring cell in line 11. The mixture is withdrawn from vessel 7 by line 10 and returned by line 11. When the desired pH is obtained valve 54 is opened and the acidified waste water goes via line 12 into stirring container 13 equipped with stirrer 56 where the treatment with chlorite takes place. The chlorite solution is introduced via line 14 with the help of regulating valve 58 and redox measuring cell 60 which is connected to line 16 by line 62. The waste water is recirculated via lines 15 and 16 and when the treatment is completed, is withdrawn through line 66 by opening valve 64 and goes to the waste water system, e.g. a sewer.

Figure 3:
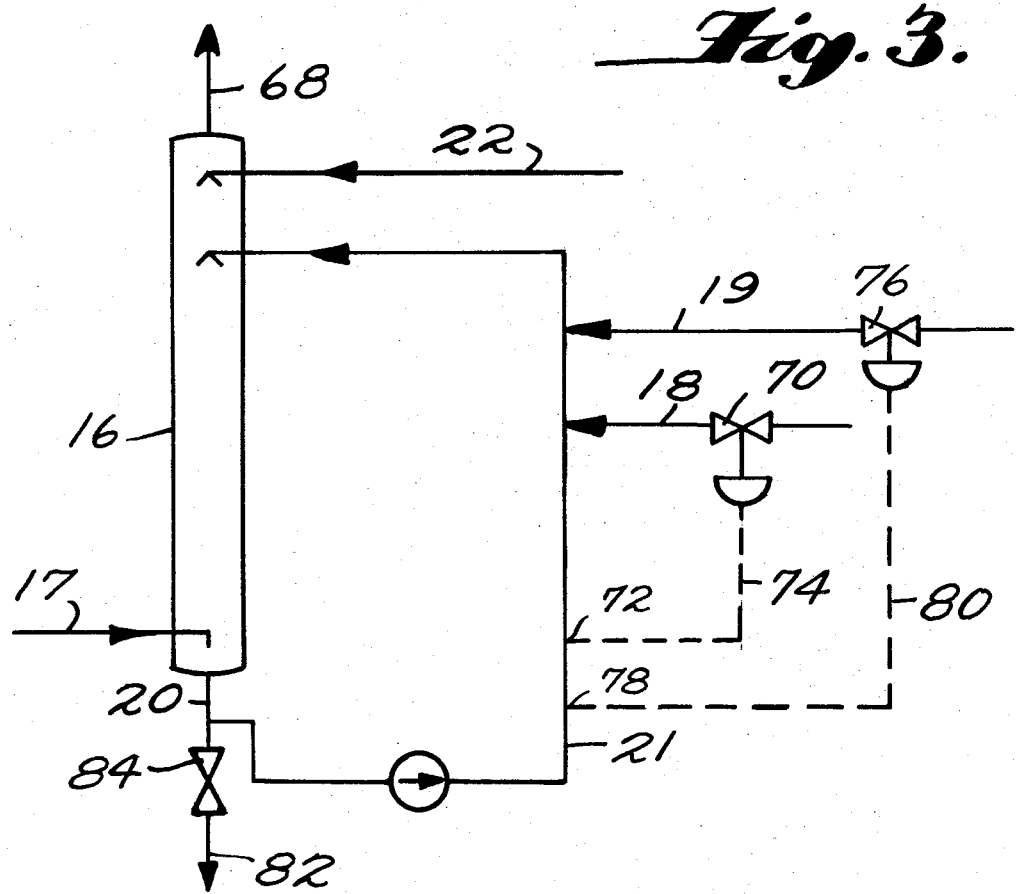
FIG. 3 illustrates a procedure for treating gases.

The treatment of unpleasantly smelling and/or poisonous waste gases with acid and chlorite, e.g. sodium chlorite, can be carried out in a manner known in itself in any adsorption column suited for the washing of gases as shown in FIG. 3. The waste gas is introduced into absorption column 16 by way of line 17. In the column it is in countercurrent flow to acidified sodium chlorite solution circulating through lines 20 and 21 back to the column 1. The treated gas leaves the column at the top via line 68. The introduction of fresh mineral acid takes place via line 18 and with the help of regulating valve 70 and measuring cell 72 is so regulated that the recirculating solution always has a pH value of below 6. The regulating valve 70 is connected by line 74 the measuring cell 72 provided in line 21. The addition of fresh sodium chlorite solution takes place via line 19 and with the help of regulating valve 76 and redox measuring cell 78 is so regulated that there is always present a just adequate excess of oxidizing agent. Regulating valve 76 is connected by line 80 with the measuring cell 78 provided in line 21. At the top of the column there can be introduced by line 22 sufficient fresh water that no disproportionation products of sodium chlorite such as chlorine dioxide occurs in the waste gases that leave via line 68. The spent recirculating solution can be withdrawn to the waste water disposal system, e.g. a sewer, by line 82. A valve 84 can be provided to regulate the removal of spent solution.

The invention will be further explained in connection with the following examples:

EXAMPLE 1

500 ml of a bad smelling, alkaline waste water from a plant for the production of methionine were brought to a pH of 3 by addition of dilute hydrochloric acid in a three necked flask provided with a stirrer and dropping funnel. 54.0 ml of aqueous sodium chlorite solution (300 grams of sodium chlorite per liter) were added. The reaction was exothermic. After 5 minutes the solution was odorless and had a potassium permanganate number of 82 mg/l. By iodometric titration it was determined that the sodium chlorite content in the treated waste water sample was 45 mg of sodium chlorite per liter.

EXAMPLE 2

500 ml of an unpleasant smelling waste water from a plant for the production of methylmercaptodichlorotriazine were brought to a pH of 2 in a three necked flask by the addition of dilute sulfuric acid, heated to 60°C. and 5.5 ml of aqueous sodium chlorite solution (300 grams of sodium chlorite/l) added. After 5 minutes the sample was odorless and had a permanganate number of 200 mg/l.

EXAMPLE 3

1,000 ml of an unpleasant smelling waste water from a plant for the production of methyl mercaptan were acidified to a pH of 4 in a three necked flask with dilute hydrochloric acid and subsequently there were added 0.3 ml of aqueous sodium chlorite solution (300 grams of sodium chlorite per liter). After 10 minutes the waste water was odorless and had a potassium permanganate number of 60 mg/l.

EXAMPLE 4

1,000 ml of an unpleasant smelling waste water from a plant for the production of beta-methylmercaptopropionaldehyde were acidified to a pH of 1 in a three necked flask with dilute hydrochloric acid and treated with 0.6 ml of aqueous sodium chlorite solution (300 grams of sodium chlorite/l). After 10 minutes the waste water was odorless and had a potassium permanganate number of 140 mg/l.

EXAMPLE 5

500 ml of an unpleasant smelling waste water from a plant for the production of a thiazolidine were acidified to a pH of 2 in a three necked flask with hydrochloric acid and subsequently treated with 1.1 ml of aqueous sodium chlorite solution (300 grams of sodium chlorite/l). After 5 minutes the waste water was odorless and had a potassium permanganate number of 200 mg/l.

EXAMPLE 6

Employing the apparatus of FIG. 2 there was continuously treated for 14 days 5 cubic meters per hour of waste water from a plant for the production of methionine. The accumulating waste water was brought to a pH of 3–4 in stirring container 7 with the help of a pH regulator by addition of 10% hydrochloric acid and subsequently with the help of a redox measuring cell treated in stirring container 13 at a residence time of 0.5 to 2 minutes with such an amount of sodium chlorite that there was always present in the solution a slight excess of sodium chlorite. The treated waste water was odorless, had a potassium permanganate number of 20.0–88.3 mg/l and a BOD 5-value (Biological Oxygen Demand during 5 days) of 1.5 to 12 mg/l. The treated waste water still contained 40–100 mg of sodium chlorite/l.

EXAMPLE 7

In an apparatus such as that described in FIG. 1 and at a residence time of 1–3 minutes, there was continuously treated with dilute hydrochloric acid and aqueous sodium chlorite solution for several weeks the waste water from a plant for the production of methyl mercaptan and beta-methylmercaptopropionaldehyde at an hourly rate of 2 m³. The hydrochloric acid and sodium chlorite were so employed that a pH of 1–3 prevailed in the reaction vessel and the waste water which left the apparatus contained an excess of 40–100 mg of sodium chlorite. The treated waste water was odorfree and had a potassium permanganate number of 80–120 mg/l.

EXAMPLE 8

In an apparatus described in FIG. 3 during several weeks there were continuously treated hourly about 60,000 m³ of unpleasant smelling waste gas from a plant for the production of methionine with such an amount of 10% hydrochloric acid and aqueous sodium chlorite solution (300 grams of sodium chlorite/l) that there was present in the circulating solution in line 20 a pH value of 1–4 and 40–100 mg/l of sodium chlorite in the waste water leaving by line 82. The departing waste gas was odorless. The departing waste water had a potassium permanganate number of 35–42 mg/l.

What is claimed is:

1. A process for the purification of (1) waste water or (2) waste gas containing an oxidizable compound selected from the group consisting of hydrogen sulfide, sulfurous acid, a mercaptan, a mercaptoamino carboxylic acid, a thioether, a disulfide, a sulfoxide, a phenol, allyl alcohol, toluene, anethol, cinnamyl alcohol, cinnamaldehyde, oleic acid, glyceryl trioleate, furfural, indole, β-methylindole and hydrogen cyanide comprising treating the waste water with alkali or alkaline earth chlorite in an acid medium at a pH up to 6 or passing the waste gas through an aqueous solution of alkali or alkaline earth chlorite at a pH of up to 6.

2. A process according to claim 1 wherein waste water is purified.

3. A process according to claim 2, wherein the waste water is waste water from the manufacture of methionine.

4. A process according to claim 2 wherein the waste water is waste water from the manufacture of a mercaptan.

5. A process according to claim 4 wherein the mercaptan is methyl mercaptan.

6. A process according to claim 2 wherein the waste water is waste water from the manufacture of methyl mercapto-propionaldehyde.

7. A process according to claim 2 wherein the waste water is waste water from the manufacture of methylmercaptodichlorotriazine.

8. A process according to claim 1, wherein waste gas is purified.

9. A process according to claim 8 wherein the oxidizable sulfur compound is hydrogen sulfide, sulfurous acid, a mercaptan, a mercaptoamino carboxylic acid, a thioether, a disulfide or a sulfoxide.

10. A process according to claim 9, wherein the waste gas is waste gas from the manufacture of methionine.

11. A process according to claim 2 wherein the oxidizable compound is hydrogen sulfide, sulfurous acid, a mercaptan, a mercaptoamino carboxylic acid, a thioether, a disulfide or a sulfoxide.

12. A process according to claim 11 wherein aqueous HCl or $H_2SO_4$ is employed to establish the pH.

13. A process according to claim 1 wherein waste water is purified and the waste water withdrawn contains 5–100 mg/l of chlorite.

14. A process according to claim 1 wherein waste gas is purified by treating with a chlorite containing acidified chlorite containing wash liquor and the wash liquor withdrawn contains 5–100 mg/l of chlorite.

* * * * *